(12) United States Patent
Robinson et al.

(10) Patent No.: US 11,936,770 B2
(45) Date of Patent: Mar. 19, 2024

(54) AUTOMORPHIC TRANSFORMATIONS OF SIGNAL SAMPLES WITHIN A TRANSMITTER OR RECEIVER

(71) Applicant: Rampart Communications, Inc., Annapolis, MD (US)

(72) Inventors: Matthew Brandon Robinson, Crownsville, MD (US); Andrew Keith Palmisano, Columbia, MD (US)

(73) Assignee: Rampart Communications, Inc., Linthicum Heights, MD (US)

( * ) Notice: Subject to any disclaimer, the term of this patent is extended or adjusted under 35 U.S.C. 154(b) by 42 days.

(21) Appl. No.: 17/668,876

(22) Filed: Feb. 10, 2022

(65) Prior Publication Data

US 2022/0255728 A1    Aug. 11, 2022

Related U.S. Application Data

(60) Provisional application No. 63/147,919, filed on Feb. 10, 2021.

(51) Int. Cl.
*H04L 9/00* (2022.01)
*H04L 9/06* (2006.01)

(52) U.S. Cl.
CPC .......... *H04L 9/0668* (2013.01); *H04L 9/008* (2013.01)

(58) Field of Classification Search
CPC ..... H04L 9/0668; H04L 9/008; H04L 9/0618; H04L 2209/34
See application file for complete search history.

(56) References Cited

U.S. PATENT DOCUMENTS

| | | | |
|---|---|---|---|
| 11,310,030 B2* | 4/2022 | De Hoogh | G06F 17/141 |
| 2004/0101048 A1* | 5/2004 | Paris | G10L 19/008 |
| | | | 704/E19.023 |
| 2007/0097856 A1 | 5/2007 | Wang et al. | |

(Continued)

FOREIGN PATENT DOCUMENTS

| | | | |
|---|---|---|---|
| EP | 1133097 A1 | 9/2001 | |
| WO | WO-2022173919 A1 | 8/2022 | |

OTHER PUBLICATIONS

International Search Report and Written Opinion for Application No. PCT/US2022/015938, dated May 17, 2022, 14 pages.

(Continued)

*Primary Examiner* — Vu V Tran
(74) *Attorney, Agent, or Firm* — COOLEY LLP

(57) ABSTRACT

A method includes receiving data and a plurality of values at a processor. The data can include real-valued data and/or complex data. The plurality of values includes one of a plurality of random values or a plurality of pseudo-random values. The method also includes generating an automorphism, via the processor, based on the plurality of values, and partitioning the data, via the processor, into a plurality of data blocks. The automorphism includes at least one of a linear transformation or an antilinear transformation. Each data block from the plurality of data blocks can have a predefined size. The method also includes applying the automorphism, via the processor, to each data block from plurality of data blocks, to produce a plurality of transformed data blocks, and causing transmission of a signal representing the plurality of transformed data blocks.

19 Claims, 2 Drawing Sheets

(56) References Cited

U.S. PATENT DOCUMENTS

| | | | |
|---|---|---|---|
| 2011/0060917 A1* | 3/2011 | Troncoso Pastoriza | ..................... G06F 21/72 713/189 |
| 2013/0216044 A1* | 8/2013 | Gentry | .................... H04L 9/008 380/277 |
| 2015/0110269 A1* | 4/2015 | Ohya | .................... H04L 9/0668 380/46 |
| 2018/0276014 A1* | 9/2018 | Kliuchnikov | ....... G06F 9/45508 |
| 2018/0332147 A1 | 11/2018 | Park et al. | |
| 2022/0382521 A1* | 12/2022 | Krcmaricic-Barackov | ................. H04L 9/0618 |

OTHER PUBLICATIONS

Wahab, H.A.B., et al., "Using Unitary Matrices in High-speed Video Encryption", International Journal of Computer Science and Network Security (IJCSNS), Jun. 1, 2015, pp. 92-95.

International Preliminary Report on Patentability for International Application No. PCT/US2022/015938, dated Aug. 24, 2023, 8 pages.

\* cited by examiner

AUTOMORPHIC TRANSFORMATIONS OF SIGNAL SAMPLES WITHIN A TRANSMITTER OR RECEIVER

CROSS-REFERENCE TO RELATED APPLICATIONS

This application claims priority to, and the benefit of, U.S. Provisional Patent Application No. 63/147,919, filed Feb. 10, 2021 and titled "Automorphic Transformations of Signal Samples Within a Transmitter or Receiver," the entire contents of which are hereby incorporated by reference.

FIELD

The present disclosure is related to encryption in data communications, and more specifically to applying automorphic transformations to signal samples within a signal processing context.

BACKGROUND

Telecommunication involves the transmission of data within wired or wireless systems. Wireless communication involves the exchange of data between points within a communications channel using an electromagnetic wave, and without the use of an electrical conductor. A basic telecommunication system includes a transmitter, a transmission medium, and a receiver. Transmitters convert data into a signal. The transmission medium carries the signal to the receiver, which in turn converts the signal back into the data for a recipient.

SUMMARY

In some embodiments, a method includes receiving data and a plurality of values at a processor. The data can include real-valued data and/or complex data. The plurality of values includes one of a plurality of random values (e.g., generated by and/or received from a random number generator) or a plurality of pseudo-random values (e.g., generated by and/or received from a pseudo-random number generator). The method also includes generating an automorphism, via the processor, based on the plurality of values, and partitioning the data, via the processor, into a plurality of data blocks. The automorphism includes at least one of a linear transformation or an antilinear transformation. Each data block from the plurality of data blocks can have a predefined size. The method also includes applying the automorphism, via the processor, to each data block from the plurality of data blocks, to produce a plurality of transformed data blocks, and causing transmission of a signal representing the plurality of transformed data blocks. Once received, the inverse of the automorphism can be applied to the plurality of transformed data blocks to convert the plurality of transformed data blocks into the original data.

In some embodiments, a system includes a processor and a memory storing processor-executable instructions. The processor-executable instructions include instructions to receive a plurality of values, and to generate an automorphism based on the plurality of values. The plurality of values includes one of a plurality of random values or a plurality of pseudo-random values. The processor-executable instructions also include instructions to divide a data set into a plurality of data blocks such that each data block from the plurality of data blocks has a predefined size. The processor-executable instructions also include instructions to apply the automorphism to each data block from plurality of data blocks, to produce a plurality of transformed data blocks, and to cause transmission of a signal representing the plurality of transformed data blocks.

DETAILED DESCRIPTION

Figure 1:
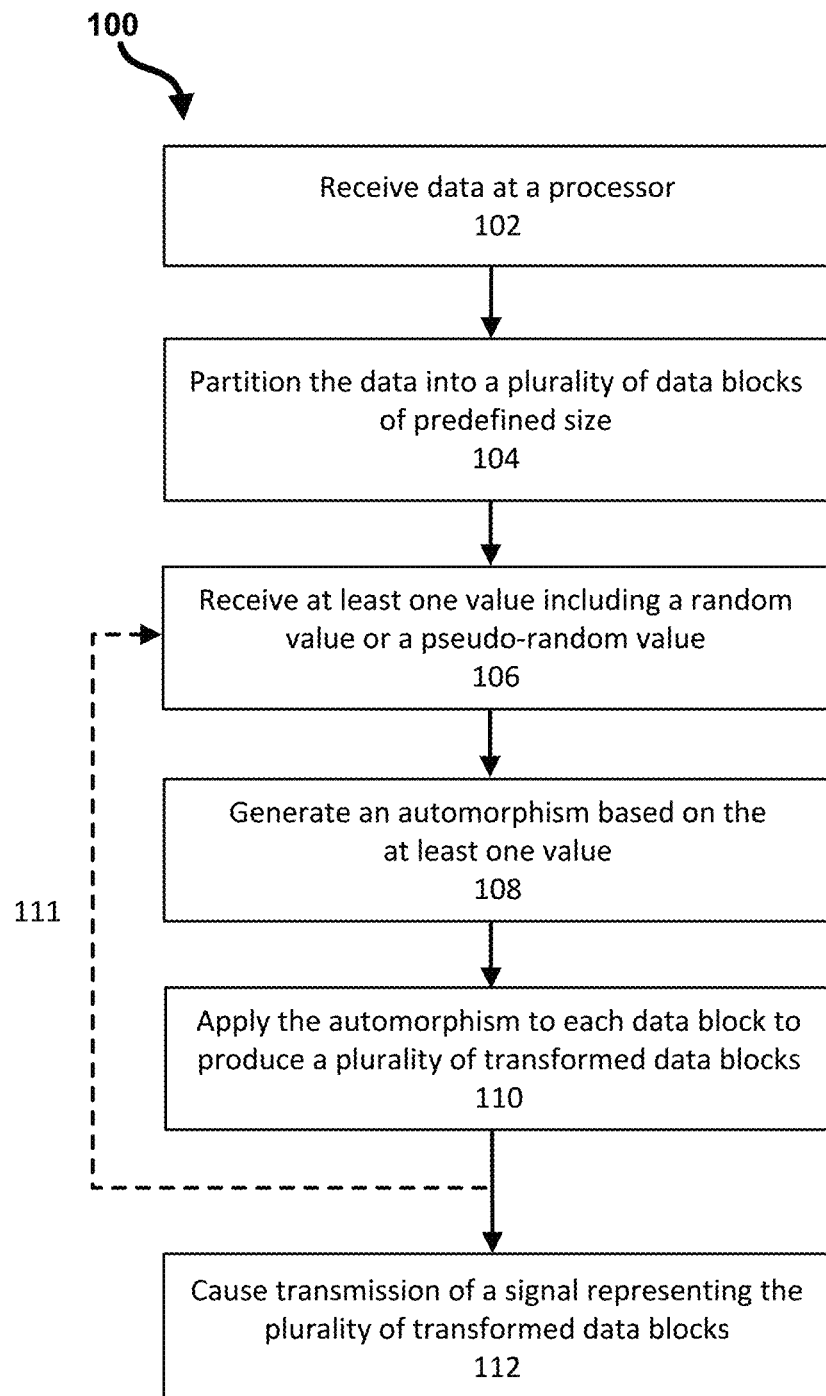
FIG. 1 is a flowchart illustrating a method for applying an automorphic transformation to data for transmission within a communications system, according to an embodiment.

In some known communication systems, received data samples are transformed based on values of the data samples themselves. For example, a transformation applied to a first sample may be based on a phase or a magnitude of a second sample. Such approaches, for example when implemented in the context of encryption, where the transformations may be nonlinear, can introduce errors. Embodiments of the present disclosure, by contrast, transform received data based on the output of a random number generator (RNG) or a pseudo-random number generator (PRNG), irrespective of the values of the received data samples themselves, as discussed below. Since the RNG and/or PRNG output is, itself, non-linear, the transformation applied to the received data can be linear, thereby avoiding the introduction of noise to the data.

Systems of the present disclosure, according to some embodiments, can include a random number generator (RNG), a pseudo-random number generator (PRNG), or any other source of random values and/or pseudo-random values. The random values and/or pseudo-random values can include binary values, real values, complex values, and/or values from any other mathematical ring or field. At least one automorphism (or "automorphic transformation," also referred to herein as a transformation) is generated, with each automorphism generated based on one of: the random values (i.e., the output of the RNG), the pseudo-random values (i.e., the output of the PRNG), or an external factor. Each automorphism can be linear, antilinear, or a combination thereof.

In some embodiments, an incoming data (e.g., represented as real signal samples and/or complex signal samples, such as baseband I/Q) is received (e.g., via a receiver) and partitioned into multiple blocks of data ("data blocks"). Each data block from the multiple data blocks can have a predefined size (e.g., a user-defined size or a processor-determined size) such that the data blocks are compatible with an automorphism. Each data block includes a subset of the incoming data. In some implementations, the data blocks do not include bits. The automorphism is generated based on one or more random values and/or pseudo-random values, and is applied to each of the data blocks in the context of (i.e., within) a signal transmitter or receiver.

As used herein, an automorphic transformation, or "automorphism," refers to an isomorphism from a data block to itself, where an isomorphism is a structure-preserving mapping between two structures of the same type that can be reversed by an inverse mapping. In the specific context of this application, automorphism refers to an invertible map from the space of blocks of signal samples, viewed as a point in a complex Hilbert space, to itself. Because such blocks will always be finite dimensionally, the automorphism can be viewed as an element of the general linear group acting on blocks of signal samples.

In some embodiments, a RNG generates complex values in pairs $(z_1, z_2)$. Each pair is, in turn, used to form an associated unitary matrix, for example as follows:

$$(z_1, z_2) \mapsto \frac{1}{\sqrt{|z_1|^2+|z_2|^2}} \begin{pmatrix} z_1 & z_2 \\ -z_2^* & -z_1^* \end{pmatrix}.$$

Once the unitary matrix is obtained, it can be applied to a pair of complex samples of a data block from the multiple data blocks. The unitary matrix is the automorphism, and the unitary matrix acts on the signal samples from the pair of complex samples, transforming them into two different samples.

In other embodiments, a RNG generates values of the form $e^{i\theta}$, where $\theta \in \mathbb{R}$. The $e^{i\theta}$ values can then be applied to complex samples of the multiple data blocks, for example by multiplication. In such embodiments, the automorphism is as follows:

$(\mathcal{Z}_1, \mathcal{Z}_2) \mapsto e^{i\theta} * (\mathcal{Z}_i, \mathcal{Z}_2)$ In some embodiments, the automorphism is a linear transformation or an antilinear transformation that is generated based on a RNG output and/or a PRNG output, and is not based on any value within the incoming data or the data blocks. Alternatively or in addition, the automorphism can be generated based on another factor, such as a size of a given data block to which the automorphism will be applied.

In some embodiments, the automorphism is an arbitrary linear/antilinear automorphism generated based on a RNG output and/or a PRNG output, and does not include a layering (whether simultaneous, concurrent, or sequential) of two transformations (e.g., a permutation and a primitive matrix) from a predefined list of transformations.

In some embodiments, the generation of an automorphism is not based on a received (to-be-transformed) data, and thus does not include dividing the received data into a magnitude and a sign vector, permuting the magnitudes, or applying a series of nonlinear layers to the sign vector. Rather, automorphisms of the present disclosure are generated based on RNG/PRNG output, are linear/antilinear, and are applied to blocks of the received data.

FIG. 1 is a flowchart illustrating a method for applying an automorphic transformation to data for transmission within a communications system, according to an embodiment. As shown in FIG. 1, the method 100 includes receiving data (e.g., including real-valued data and/or complex data), at 102, and partitioning or subdividing the data, at 104, into a plurality of data blocks. The method 100 also includes receiving at least one value, at 106, the at least one value including a random value (e.g., generated by and/or received from a random number generator) or a pseudo-random value (e.g., generated by and/or received from a pseudo-random number generator). The method 100 also includes generating an automorphism, at 108, based on the at least one value (and not based on the received data). The automorphism can include a linear transformation and/or an antilinear transformation. In some implementations, each data block from the plurality of data blocks has a common predefined size. In other implementations, the data blocks from the plurality of data blocks can have differing sizes, for example within the plurality of data blocks at a given time, or varying over time according to a predefined pattern of changing data block sizes. In some such implementations, a representation of the block size may be transmitted/communicated with the transformed data block(s). The method 100 also includes applying the automorphism, at 110, to each data block from plurality of data blocks, to produce a plurality of transformed data blocks, and causing transmission of a signal representing the plurality of transformed data blocks at 112. Optionally, steps 106 through 110 are iterated a predefined number of times (e.g., twice, three times, four times, etc.) prior to the transmission at 112.

In some embodiments, a method includes receiving data (e.g., including real-valued data and/or complex data), and partitioning or subdividing the data into a plurality of data blocks. A series or sequence of automorphisms (e.g., two, three, four, or more automorphisms) can then be applied to each data block from the plurality of data blocks prior to transmission. For example, in one embodiment, during transformation, a first (e.g., generated by a first PRNG output) automorphism is applied to a given data block, to produce a first-transformed data block. A second (e.g., generated by a second PRNG output different from the first PRNG output) automorphism is then applied to the first-transformed data block, to produce a second-transformed data block. Next, a third automorphism (e.g., generated based on a first external factor) is applied to the second-transformed data block, to produce a third-transformed data block. Next, a fourth automorphism (e.g., generated based on a second external factor different from the first external factor) is applied to the third-transformed data block, to produce a fourth-transformed data block. Once the foregoing procedure has been applied to all data blocks, resulting in a plurality of fourth-transformed data blocks, the method can include causing transmission of a signal representing the plurality of fourth-transformed data blocks (e.g., to a remote receiver).

Figure 2:
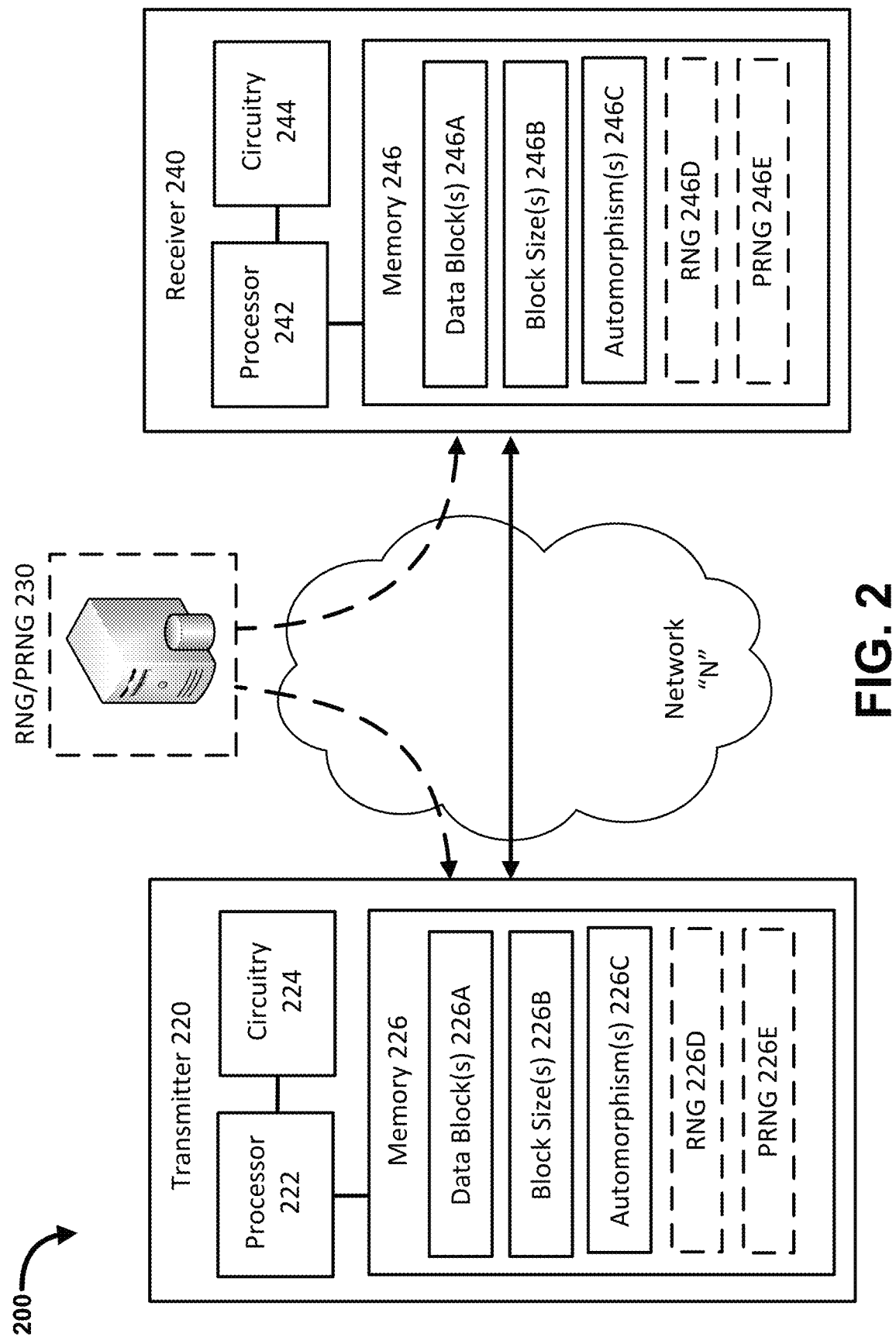
FIG. 2 is a diagram of a system for applying automorphic transformations to data for transmission within a communications system, according to an embodiment.

FIG. 2 is a diagram of a system 200 for applying automorphic transformations to data for transmission within a communications system, according to an embodiment. As shown in FIG. 2, the system 200 includes a transmitter 220, a receiver 240, and optionally a compute device 230 that includes a random number generator (RNG) and/or a pseudo-random number generator (PRNG). The transmitter 220, the receiver 240, and the compute device 230 can communicate with one another via a communications network "N" (e.g., a wireless communications network or a wired communications network). The transmitter 220 includes a processor 222, transmission circuitry 224 (e.g., including one or more antennas), and a memory 226. The memory 226 stores data blocks 226A (e.g., as obtained at step 108 of method 100 in FIG. 1), block sizes 226B, automorphisms 226C (e.g., as generated at step 106 of method 100 in FIG. 1), and optionally a random number generator 226D and/or a pseudo-random number generator 226E. The block sizes 226B can be predefined by an administrator or user, e.g., via a graphical user interface (GUI) of the transmitter 220, or can be automatically defined and modifiable based for example on one or more of a level of security of the communications system, a nature of the communications system, or a desired processing time (e.g., if larger data blocks take longer to process than smaller data blocks). Similar to the transmitted 220, the receiver 240 includes a processor 242, reception circuitry 244 (e.g., including one or more antennas), and a memory 246. The memory 246 stores data blocks 246A, block sizes 246B, automorphisms 246C, and optionally a random number generator 246D and/or a pseudo-random number generator 246E.

In some embodiments, a method (e.g., for data transmission) includes receiving data and a plurality of values at a processor. The data can include real-valued data and/or complex data. The plurality of values includes one of a plurality of random values (e.g., generated by and/or received from a random number generator) or a plurality of pseudo-random values (e.g., generated by and/or received from a pseudo-random number generator). The method also includes generating an automorphism, via the processor, based on the plurality of values, and partitioning the data, via the processor, into a plurality of data blocks. The automorphism includes at least one of a linear transformation or an antilinear transformation. Each data block from the plurality of data blocks can have a predefined size. The method also includes applying the automorphism, via the processor, to each data block from plurality of data blocks, to produce a plurality of transformed data blocks, and causing transmission of a signal representing the plurality of transformed data blocks.

In some embodiments, no data block from the plurality of data blocks consists of an individual bit. Rather, each data block includes one or more real/complex signal samples (which may be represented by sets of bits), such that the automorphism is applied to real/complex signal samples and not to individual bits. In other words, the automorphism, from a mathematical standpoint, does not perform a binary operation on the plurality of data blocks. This is in contrast to other techniques (e.g., for encryption, scrambling, etc.) that involve actions directly on bits.

In some embodiments, the plurality of values includes the plurality of random values, and the plurality of random values includes complex value pairs. In some such embodiments, the automorphism is defined as:

$$(z_1, z_2) \mapsto \frac{1}{\sqrt{|z_1|^2 + |z_2|^2}} \begin{pmatrix} z_1 & z_2 \\ -z_2^* & -z_1^* \end{pmatrix},$$

where ($\mathcal{Z}_1$, $\mathcal{Z}_2$) is a complex value pair from the complex value pairs, * denotes a complex conjugate, and each of |$\mathcal{Z}_1$| and |$\mathcal{Z}_2$| denotes the absolute value, or modulus, of that complex value from the complex value pair.

In some embodiments, the plurality of values includes the plurality of random values, and each random value from the plurality of random values is of the form $e^{i\theta}$, where $\theta \in \mathbb{R}$.

In some embodiments, a system (e.g., a transmitter, such as transmitter 220 in FIG. 2) includes a processor and a memory storing processor-executable instructions. The processor-executable instructions include instructions to receive a plurality of values, and to generate an automorphism based on the plurality of values. The plurality of values includes one of a plurality of random values or a plurality of pseudo-random values. The processor-executable instructions also include instructions to divide a data set into a plurality of data blocks such that each data block from the plurality of data blocks has a predefined size. The processor-executable instructions also include instructions to apply the automorphism to each data block from plurality of data blocks, to produce a plurality of transformed data blocks, and to cause transmission (e.g., to a receiver, such as receiver 240 in FIG. 2) of a signal representing the plurality of transformed data blocks.

In some embodiments, the automorphism consists of a single matrix (e.g., a unitary matrix) and not a combination or layering of matrices.

In some embodiments, the automorphism includes at least one of a linear transformation or an antilinear transformation.

In some embodiments, the data set includes real samples and complex samples of baseband signal data.

In some embodiments, no data block from the plurality of data blocks consists of an individual bit.

In some embodiments, the plurality of values includes the plurality of random values, and the plurality of random values includes complex value pairs.

In some embodiments, the automorphism is defined as:

$$(z_1, z_2) \mapsto \frac{1}{\sqrt{|z_1|^2 + |z_2|^2}} \begin{pmatrix} z_1 & z_2 \\ -z_2^* & -z_1^* \end{pmatrix},$$

where ($\mathcal{Z}_1$, $\mathcal{Z}_2$) is a complex value pair from the complex value pairs, and * denotes a complex conjugate.

In some embodiments, the plurality of values includes the plurality of random values, and each random value from the plurality of random values is of the form $e^{i\theta}$, where $\theta \in \mathbb{R}$.

In some embodiments, the plurality of values is a random number generator generated plurality of values.

In some embodiments, the plurality of values is a pseudo-random number generator generated plurality of values.

In some embodiments, a system (e.g., a receiver, such as receiver 240 in FIG. 2) includes a processor and a memory. The memory stores instructions to cause the processor to receive or generate a plurality of values including one of a plurality of random values or a plurality of pseudo-random values, and to generate an automorphism based on the plurality of values. The memory also stores instructions to cause the processor to receive (e.g., from a transmitter, such as transmitter 220 of FIG. 2) a signal representing a data block, and to apply the inverse of the automorphism to the data block to obtain a modified data block. The received data block may include transformed data, and the applying the inverse of the automorphism can undo/reverse a previously applied transformation, to convert the transformed data into the original data. In some such embodiments, the transmitter and the receiver can be synchronized such that each of the transmitter and the receiver generates or receives the same random values or pseudo-random values at either the same times, or at a predefined time shift from one another.

As used herein, a "transmitter," or "signal transmitter," can include any combination of components that are used in the transmission of signals, including any combination of antennas, amplifiers, cables, digital-to-analog converters, filters, up-converters, and processors. Similarly, a "receiver," or "signal receiver," as used herein, can include any combination of components that are used in receiving signals, including any combination of antennas, amplifiers, cables, analog-to-digital converters, filters, down-converters, and processors.

Implementations of the various techniques described herein may be implemented in digital electronic circuitry, or in computer hardware, firmware, software (executed or stored in hardware), or in combinations of them. Implementations may be implemented as a computer program product, i.e., a computer program tangibly embodied, e.g., in a machine-readable storage device (computer-readable medium, a non-transitory computer-readable storage medium, a tangible computer-readable storage medium, see for example, media 112 and 114 in FIG. 1), for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A method, comprising:
receiving data at a processor;
receiving, via the processor, a plurality of values including at least one complex value pair;
generating an automorphism, via the processor, based on the plurality of values;
partitioning the data, via the processor, into a plurality of data blocks;
applying the automorphism, via the processor, to each data block from the plurality of data blocks, to produce a plurality of transformed data blocks; and
causing transmission of a signal representing the plurality of transformed data blocks.

2. The method of claim 1, wherein no data block from the plurality of data blocks consists of an individual bit.

3. The method of claim 1, wherein the at least one complex value pair includes at least one random value from a plurality of random values.

4. The method of claim 3, wherein the automorphism is defined as:

$$(z_1, z_2) \mapsto \frac{1}{\sqrt{|z_1|^2 + |z_2|^2}} \begin{pmatrix} z_1 & z_2 \\ -z_2^* & -z_1^* \end{pmatrix},$$

where ($\mathscr{Z}_1$, $\mathscr{Z}_2$) is a complex value pair from the at least one complex value pair, and * denotes a complex conjugate.

5. The method of claim 1, wherein the data includes real-valued data.

6. The method of claim 1, wherein the data includes complex data.

7. The method of claim 1, wherein the automorphism includes at least one of a linear transformation or an anti-linear transformation.

8. The method of claim 1, wherein the plurality of values is received from a random number generator.

9. The method of claim 1, wherein the plurality of values is received from a pseudo-random number generator.

10. A system, comprising:
a processor; and
a memory storing instructions to cause the processor to:
receive a plurality of values including at least one complex value pair,
generate an automorphism based on the plurality of values,
divide a data set into a plurality of data blocks, each data block from the plurality of data blocks having a predefined size,
apply the automorphism to each data block from plurality of data blocks, to produce a plurality of transformed data blocks, and
cause transmission of a signal representing the plurality of transformed data blocks.

11. The system of claim 10, wherein the automorphism consists of a unitary matrix.

12. The system of claim 10, wherein the automorphism includes at least one of a linear transformation or an anti-linear transformation.

13. The system of claim 10, wherein the data set includes real samples and complex samples of baseband signal data.

14. The system of claim 10, wherein no data block from the plurality of data blocks consists of an individual bit.

15. The system of claim 10, wherein the at least one complex value pair includes at least one random value from a plurality of random values.

16. The system of claim 10, wherein the automorphism is defined as:

$$(z_1, z_2) \mapsto \frac{1}{\sqrt{|z_1|^2 + |z_2|^2}} \begin{pmatrix} z_1 & z_2 \\ -z_2^* & -z_1^* \end{pmatrix},$$

where $(z_1, z_2)$ is a complex value pair from the at least one complex value pair, and * denotes a complex conjugate.

17. The system of claim 10, wherein the plurality of values is a random number generator generated plurality of values.

18. The system of claim 10, wherein the plurality of values is a pseudo-random number generator generated plurality of values.

19. A system, comprising:
a processor; and
a memory storing instructions to cause the processor to:
receive a plurality of values including at least one complex value pair,
generate an automorphism based on the at least one complex value pair from the plurality of values,
receive a signal representing a data block, and
apply the inverse of the automorphism to the data block to obtain a modified data block.

* * * * *